Patented Nov. 18, 1952

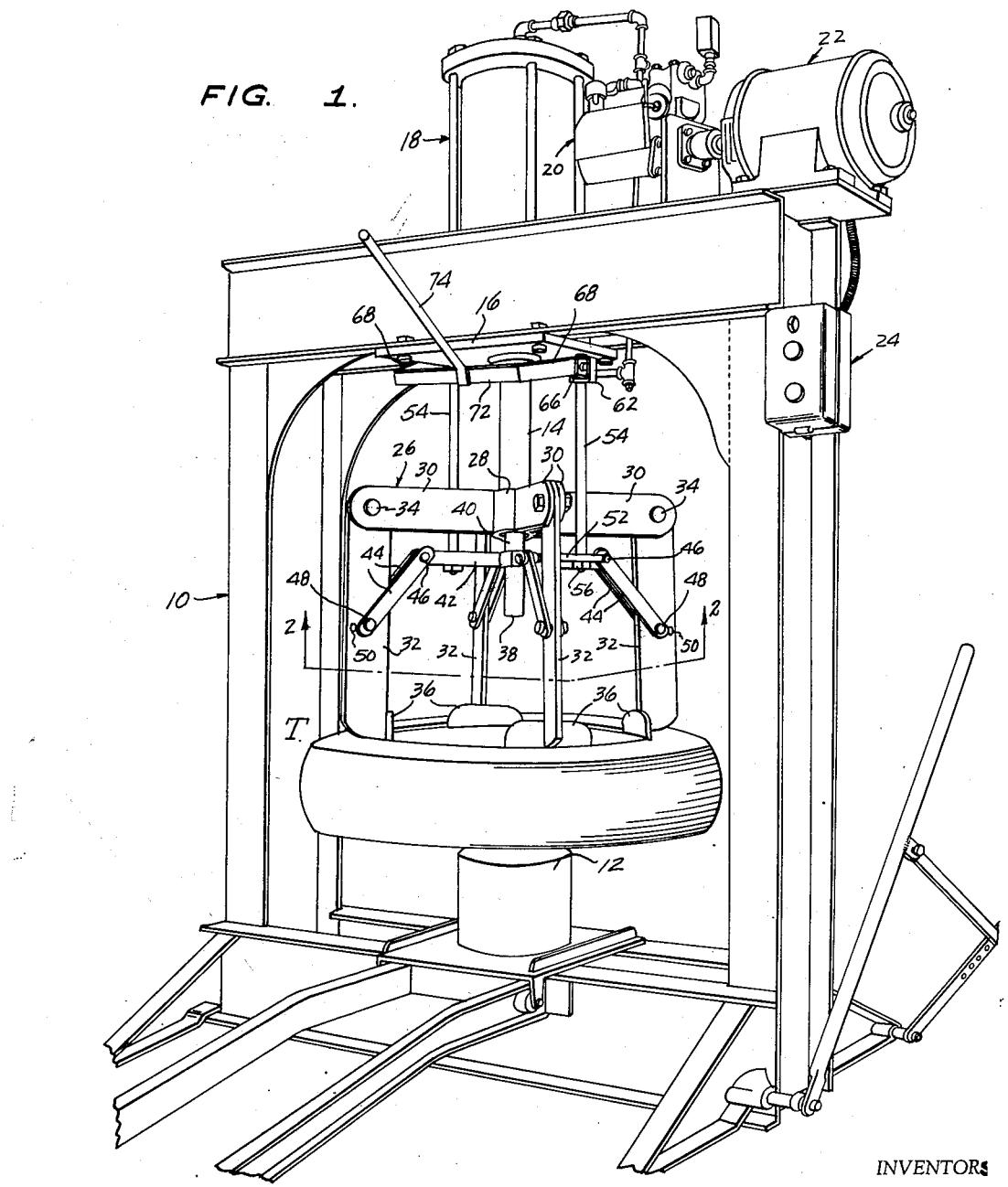

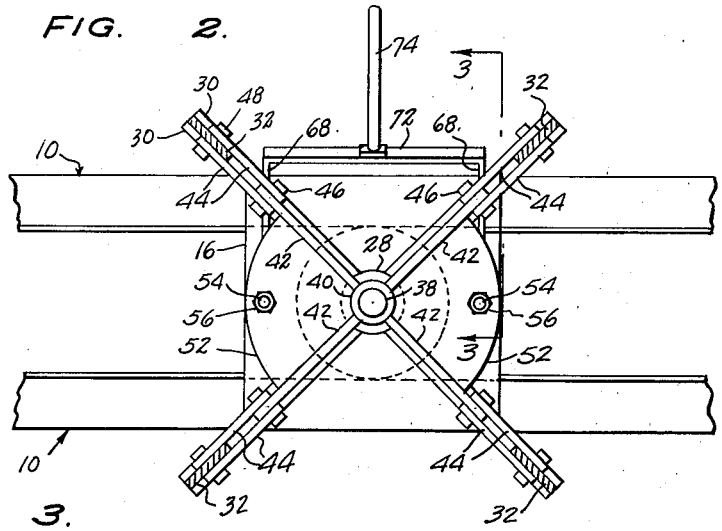
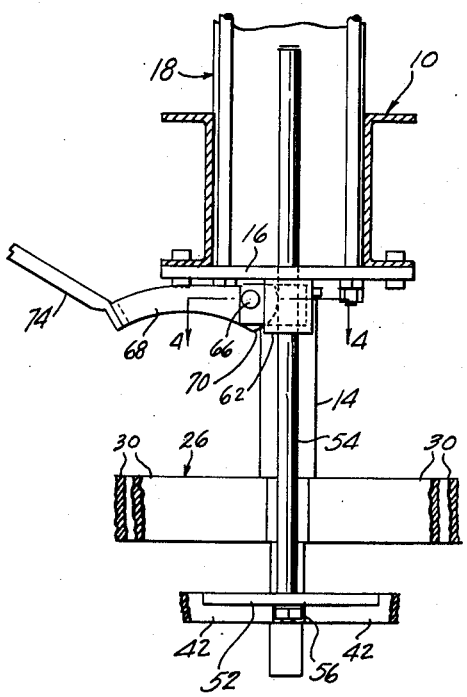
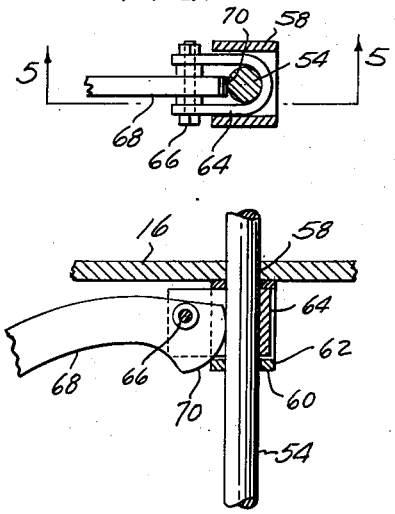

2,618,320

UNITED STATES PATENT OFFICE 2,618,320

RADIUS ADJUSTING MECHANISM FOR TIRE REMOVING MACHINES

William L. Deysher and David Monson, San Anselmo, Calif.

Application December 14, 1951, Serial No. 261,728

4 Claims. (Cl. 157—1.2)

Generally, this invention relates to tire removing machines of the axially shiftable type. Particularly, the invention refers to a mechanism for radially adjusting the working head of such a machine, to adapt the machine for the removal for tires of different sizes.

Tire removing machines are not new per se, and means for radially expanding the working heads of such machines is also broadly old. However, those radius adjustment mechanisms of which we have knowledge generally necessitate the relocation of connecting pins or bolts, which in most instances is a time consuming operation which must be carried out manually. In other devices of this type, an adjusting screw must be manually rotated. Again, the operation is in our opinion unnecessarily tedious and time consuming.

It is, accordingly, the main object of the present invention to provide a radius adjusting mechanism for the working head of a tire removing machine wherein a simply designed lever control is operable in a manner to coact with the conventional hydraulically advanced, tire-removing piston or ram in contracting or expanding the working head of the machine radially.

Another important object is to provide a structure of the character stated in which a simple throw of a conveniently located operating handle while the ram is moving toward or away from the tire is effective to set the radius adjusting means into operation to contract or expand the working head, a throw of the operating lever in the opposite direction as soon as the working head is visually observed to be in a properly adjusted condition being effective to retain the head in its selected position of adjustment.

Yet another important object is to provide a mechanism of the type stated which can be incorporated in a conventional hydraulically operated tire removing machine of the axially shifting type, as a separate attachment that will not require modification or redesigning of the overall structure.

Still another important object is to provide an assembly as stated which can be manufactured at relatively low cost, considering the benefits to be obtained, will be rugged and durable, and will be composed of a minimum of parts simply arranged in a manner whereby they will not readily get out of order.

Other objects will appear from the following description, the claims appended thereto, and from the annexed drawing, in which like reference characters designate like parts throughout the several views, and wherein:

Figure 1 is a perspective view of a tire removing machine of the axially shiftable type and of an adjusting mechanism formed in accordance with the present invention;

Figure 2 is a section through the working head of the machine taken substantially on line 2—2 of Figure 1;

Figure 3 is a vertical sectional view through the working head, taken substantially on line 3—3 of Figure 2;

Figure 4 is an enlarged detail sectional view taken substantially on line 4—4 of Figure 3; and Figure 5 is a sectional view taken on line 5—5 of Figure 4.

In considering the invention in detail, reference should first be had to Figure 1, wherein we have illustrated a generally conventional tire removing machine of the hydraulically operated, axially shiftable type. The machine includes a vertically disposed, open, rectangular frame designated generally by the reference numeral 10. This is preferably formed with vertically ascending sides comprising a pair of spaced, parallel I beams rigid at their upper and lower ends with horizontally extended pairs of channels. Adapted to be rolled onto the lower pair of channels is a pedestal 12 on which is supported a tire T and its associated rim. At this point, it may be noted that while we have illustrated by way of example a rollable pedestal which is manually shifted onto or off the frame, hydraulic means might well be employed for shifting the tire and its associated pedestal laterally onto or off the frame. Further, it is believed apparent that a hydraulic hoist or equivalent means might be employed to raise the tire to the proper elevation when it has been placed upon the frame. Such hydraulic assemblies, it should be noted, do not constitute part of the present invention, and are mentioned merely to show various attachments which could be embodied in the tire removing machine illustrated without interference with or from the lever controlled radius adjustment mechanism to be described hereinafter.

Mounted to shift vertically of the frame, medially between the opposite sides of the frame, is a hydraulic ram or piston 14, slidable in and projecting downwardly from a plate 16 rigidly mounted upon the undersides of the upper channels, the plate having a center opening in which the piston is slidable, which center opening would be suitably packed to prevent leakage of fluid. A hydraulic cylinder is mounted upon the plate 16, and has been designated generally by the reference numeral 18, said cylinder being controlled through the medium of a pump assembly generally designated 20, that is operated by an electric motor 22 controlled from a switch box or panel 24.

Fixedly secured to the piston 14 intermediate the opposite ends of the piston is a cross head designated generally 26. The cross head includes a collar 28 fixed to and surrounding the piston 14, said collar being integral or otherwise rigid with radially extending, horizontally disposed, pairs of arms 30. In the present instance, four equidistantly spaced pairs are illustrated, but a greater or fewer number can be used if desired.

Between the arms 30 of each pair of arms, there is positioned the upper end of a depending prong 32, which is pivotally connected at said upper end thereof to the arms 30 by means of pivot bolts or pins 34. Fixedly connected to the lower or free ends of the prongs 32 are arcuate shoes 36 adapted to engage the side wall of the tire T at locations spaced circumferentially of and contiguous to the rim of the tire, so as to break the tire casing away from its associated rim when the piston or ram 14 is shifted downwardly. These are also adapted, when a tire is being inflated, to engage the lock ring of the wheel, thus to hold the lock ring securely and thereby protect the operator from being injured by the lock ring blowing off during inflation of the tire.

Integral or otherwise made rigid with the lower end of the piston or ram 14 is a reduced axial extension 38, on which is slidable a sleeve 40. The sleeve 40 constitutes the central part of a spider including a plurality of equidistant, radially extended spider arms 42, that are fixedly secured at their inner ends to the sleeve.

Pairs of connecting links 44 are associated with the respective spider arms 42, the links 44 of each pair being connected to the outer ends of their associated spider arm by means of a pivot pin or bolt 46. The links 44 extend radially and outwardly of the sleeve 40, in alignment with the respective spider arms, and are connected pivotally at their outer ends to intermediate portions of the several prongs 32, by means of pivot pins or bolts 48. If desired, the prongs 32 can be provided with a plurality of apertures 50, any of which is adapted to receive a pivot pin 48. However, it will be understood that it is not necessary that the pivot pins 48 be shifted from one aperture 50 to another in effecting adjustments of the working head of the tire removing machine, a plurality of said apertures 50 being provided merely to permit an initial setting of the links to be made where, for example, it is expected that a large number of tires of large size is to be acted upon by the machine.

For the purpose of reinforcing the spider, diametrically opposite gussets or reinforcing plates 52 can be used, these being fixedly secured to the several arms 42, in a manner best shown in Figure 2.

A pair of adjusting rods 54 is utilized in the invention, the adjusting rods 54 being vertically disposed in parallelism with and at opposite sides of the ram 14. The rods 54 are formed with reduced, threaded lower ends extended through openings formed in the respective plates 52, nuts 56 being threaded on said lower ends of the plates so as to fixedly connect the rods to the spider.

Formed in the plate 16 are apertures 58 in which the rods 54 are slidable, and welded or otherwise fixedly secured to the under side of the plate 16, in registration with the openings 58, are bracket supports 62 having openings 60. The bracket supports are of open, rectangular formation, and the rods 54 slide vertically in said supports. Each bracket support (see Figures 4 and 5) has mounted therein a U-shaped, horizontally arranged, clamping bracket 64 the arms of which project laterally beyond the bracket supports associated therewith. A pivot pin 66 extends transversely between and is carried by the arms of each bracket 64, said pivot pins of the respective brackets 64 extending through the inner ends of a pair of lever arms 68, which are thus mounted for vertical swinging movement upon the pivot pins.

The inner end edges of the lever arms 68 are formed with arcuate cam surfaces 70 eccentric to the axes of the pivot pins, and as a result, when the arms 68 are swung downwardly, the cam surfaces engage the rods 54, and force them against the bights of the clamping brackets 64, thus to lock the rods 54 against movement relative to the plate 16 and bracket supports 62.

Rigidly secured to and extending between the outer ends of the lever arms 68 is a cross member 72, and secured fixedly to an intermediate portion of the cross member is an elongated operating handle 74.

In use, the adjusting mechanism operates to obtain the desired setting of the working head as follows: assuming that it is desired to draw the shoes 36 inwardly for removal of a tire T of relatively small size, the hydraulic means 18, 20, 22, 24, is operated to shift the ram 14 and its associated axial extension 38 downwardly. Before or during downward movement of the ram, the lever handle 74 is pulled downwardly, locking the rods 54 against movement. As a result, although the cross head 26 and its associated prongs 32 move downwardly with the ram, the spider is held stationary, so far as the sleeve 40 and spider arms 42 thereof are concerned.

This causes the pivotal connections 48 to swing inwardly toward the center of the assembly, about the respective pivot axes 46, and a corresponding movement of the lower ends of the prongs 32 about the pivot axes 34 results. A contraction of the radius of the working head defined by the shoes 36 is thus achieved.

As soon as the shoes 36 have been swung inwardly to the desired extent, the lever handle is thrown upwardly, and the spider and cross head 26 will now move as a unit against the tire casing, to break the casing away from the rim to which it is locked.

It may be noted that contraction of the working head can be achieved during downward movement of the ram 14, without halting said downward movement. In other words, with the tire T in proper position, the ram 14 can be given downward movement, and as the shoes 36 approach the tire casing, the lever handle 74 can be pulled downwardly, causing the shoes 36 to be given inward, radially contracting, movement conjointly with the downward movement thereof. Then, while the ram 14 is still moving downwardly, the lever handle 74 can be thrown upwardly immediately prior to the contacting of the tire casing by the shoes.

To expand the working head of the structure, the lever handle 74 is pulled downwardly while the ram 14 is moving upwardly, and the lower ends of the prongs 32 will now swing outwardly. As soon as the shoes 36 have then swung outwardly to the desired extent, and while the ram 14 is still moving upwardly, the lever handle 74 is thrown upwardly, unlocking the rods 54 and permitting the spider and cross head to move upwardly as a unit. Thereafter, with the shoes 36 in their properly adjusted positions, the ram 14 is given the downward movement necessary to engage the tire casing and remove it from its associated rim.

It will be readily appreciated that the adjustments are achieved without the necessity of relocating pins or bolts, or manually rotating adjusting screws or the like. This, it has been found, represents a considerable saving in time, which is important in large shops where a substantial number of tires must be removed from their rims regularly.

It is further believed to be of importance that the adjustments, when effected, impose no strain upon the adjusting spider, the tire removing pressure being exerted directly through the ram 14 to the pressure arms 30 of the cross head 26, and then through the prongs 32 to the tire.

Still further, it is believed to be an important characteristic of the invention that the adjusting mechanism is so formed and located as not to interfere with the hydraulic ram advancing and retracting means, or with any other hydraulic devices that may be embodied in the structure, such as hydraulic tire positioners or elevating assemblies. Conversely, hydraulic mechanisms and assemblies of the character referred to do not interfere with the adjusting mechanism described herein, by reason of the particular form and arrangement of said mechanism.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In a mechanism for effecting radius adjustments of the working head of a tire removing machine of the axially shifting type, the combination, with the supporting frame of said machine, a tire-supporting pedestal mounted on the frame, and with a ram slidably mounted on the frame for movement toward and away from the pedestal, of a cross head including a plurality of pressure arms fixed to and projecting laterally from the ram; prongs extending from and having one end pivotally connected to the respective pressure arms, for swinging movement of the other ends of the prongs toward and away from the axis of the ram, said other ends of the prongs being adapted for engagement with a tire casing supported on the pedestal and constituting a working head on said machine; a spider mounted on the ram to slide longitudinally thereof, the spider including a plurality of spider arms extending radially from the ram, the spider further including links having one end pivotally connected to the outer ends of the spider arms and their other ends connected pivotally to intermediate portions of the respective prongs; a plurality of rods rigid with the spider and slidably mounted on the frame; and means for releasably locking the rods against movement relative to the supporting frame, to effect movement of said other ends of the prongs radially of the ram responsive to slidable movement of the ram relative to the supporting frame, thus to adjust the radius of the tire-engaging head to accommodate different diameters of tire to be moved.

2. In a mechanism for effecting radius adjustments of the working head of a tire removing machine of the axially shifting type, the combination, with the supporting frame of said machine, a tire-supporting pedestal mounted on the frame, and with a ram slidably mounted on the frame for movement toward and away from the pedestal, of a cross head including a plurality of pressure arms fixed to and projecting laterally from the rams; prongs extending from and having one end pivotally connected to the respective pressure arms, for swinging movement of the other ends of the prongs toward and away from the axis of the ram, said other ends of the prongs being adapted for engaging a tire casing supported on the pedestal and constituting a working head on said machine; a spider mounted on the ram to slide longitudinally thereof, the spider including a plurality of spider arms extending radially from the ram, the spider further including links having one end pivotally connected to the outer ends of the spider arms and their other ends connected pivotally to intermediate portions of the respective prongs; a plurality of rods arranged in parallelism with the ram and rigidly connected to the spider, the frame having openings in which the rods are slidably mounted; and cam means operatively associated with the rods to releasably bind the same against the walls of said openings and thereby lock the rods against movement relative to the supporting frame, to effect movement of said other ends of the prongs radially of the ram responsive to slidable movement of the ram relative to the supporting frame, and thus adjust the radius of the tire-engaging head to accommodate different sizes of tires to be removed.

3. In a mechanism for effecting radius adjustments of the working head of a tire removing machine of the axially shifting type, the combination, with the supporting frame of said machine, a tire-supporting pedestal mounted on the frame, and with a ram slidably mounted on the frame for movement toward and away from the pedestal, of a cross head including a plurality of pressure arms fixed to and projecting laterally from the ram; prongs extending from and having one end pivotally connected to the respective pressure arms, for swinging movement of the other ends of the prongs toward and away from the axis of the ram, said other ends of the prongs being adapted for engaging a tire casing supported on the pedestal and constituting a working head on said machine; a spider mounted on the ram to slide longitudinally thereof, the spider including a plurality of spider arms extending radially from the ram, the spider further including links having one end pivotally connected to the outer ends of the spider arms and their other ends connected pivotally to intermediate portions of the respective prongs; a plurality of rods arranged in parallelism with the ram and rigidly connected at one end to the spider; bracket supports rigid with the frame and having openings slidably receiving the other ends of the rods; U-shaped clamp brackets carried by said supports and embracing the respective rods; and manually swingable lever arms pivotally mounted on said brackets and having cam surfaces engageable with the rods to bind the same against the walls of said openings, to thereby lock the rods against movement relative to the supporting frame, to effect movement of said other ends of the prongs radially of the ram responsive to slidable movement of the ram relative to the supporting frame, and thus adjust the radius of the tire-engaging working head to accommodate different sizes of tires to be removed.

4. In a mechanism for effecting radius adjustments of the working head of a tire removing machine of the axially shifting type, the combination, with the supporting frame of said machine, a tire-supporting pedestal mounted on the frame, and with a ram slidably mounted on the frame for movement toward and away from the pedestal, of a cross head including a plurality of pressure arms fixed to and projecting laterally from the ram; prongs extending from and having one end pivotally connected to the respective pressure arms, for swinging movement of the other ends of the prongs toward and away from the axis of the ram, said other ends of the prongs being adapted for engaging a tire casing supported on the pedestal and constituting a working head on said machine; a spider mounted on the ram to slide longitudinally thereof, the spider including a plurality of spider arms extending radially from the ram, the spider further including links having one end pivotally connected to the outer ends of the spider arms and their other ends connected pivotally to intermediate portions of the respective prongs; a plurality of rods arranged in parallelism with the ram and rigidly connected at one end to the spider; bracket supports rigid with the frame and having openings slidably receiving the other ends of the rods; U-shaped clamp brackets carried by said supports and embracing the respective rods; and lever arms connected for joint swinging movement and pivotally mounted on the respective clamp brackets, the lever arms having arcuate cam surfaces eccentric to the pivot axes of the lever arms and adapted to engage the rods to bind the same against the walls of said openings, thereby to clamp the rods fixedly to the supporting frame, for effecting movement of said other ends of the prongs radially of the ram responsive to slidable movement of the ram relative to the supporting frame and thus adjust the radius of the tire-engaging working head to accommodate different sizes of tires to be removed.

WILLIAM L. DEYSHER
DAVID MONSON.

REFERENCES CITED

The following references are of record in the file of this patent:

UNITED STATES PATENTS

| Number | Name | Date |
|---|---|---|
| 1,890,746 | O'Dell | Dec. 13, 1932 |
| 2,370,482 | Morgan et al. | Feb. 27, 1945 |
| 2,446,963 | Stolz | Aug. 10, 1948 |
| 2,488,539 | Holbrook | Nov. 22, 1949 |
| 2,534,594 | Haecker | Dec. 19, 1950 |
| 2,536,139 | Ritter | Jan. 2, 1951 |